US005678829A

United States Patent [19]
Kalsi et al.

[11] Patent Number: 5,678,829
[45] Date of Patent: Oct. 21, 1997

[54] HYDRODYNAMICALLY LUBRICATED ROTARY SHAFT SEAL WITH ENVIRONMENTAL SIDE GROOVE

[75] Inventors: Manmohan S. Kalsi, Houston; William T. Conroy, Pearland, both of Tex.

[73] Assignee: Kalsi Engineering, Inc., Sugar Land, Tex.

[21] Appl. No.: 661,583

[22] Filed: Jun. 7, 1996

[51] Int. Cl.⁶ .................................................. F16J 15/54
[52] U.S. Cl. ........................ 277/134; 277/152; 277/165
[58] Field of Search ................................. 277/134, 152, 277/165, 188 R, 205, 133

[56] References Cited

U.S. PATENT DOCUMENTS

| | | | |
|---|---|---|---|
| 4,195,849 | 4/1980 | Taft | 277/205 |
| 4,231,579 | 11/1980 | Scannell | 277/205 |
| 4,252,352 | 2/1981 | Scannell | 277/205 |
| 4,610,319 | 9/1986 | Kalsi | 175/371 |
| 4,739,997 | 4/1988 | Smetana | 277/205 |
| 4,858,516 | 8/1989 | Klein | 277/205 |
| 5,230,520 | 7/1993 | Dietle et al. | 277/134 |
| 5,385,353 | 1/1995 | Edlund | 277/188 R |
| 5,431,415 | 7/1995 | Millenig et al. | 277/205 |

*Primary Examiner*—Daniel G. DePumpo
*Attorney, Agent, or Firm*—Bush, Riddle & Jackson, LLP

[57] ABSTRACT

The present invention is a hydrodynamically lubricated interference type rotary shaft seal suitable for environmental exclusion and high pressure lubricant retention which incorporates an environment-side groove to control and minimize interfacial contact pressure at the dynamic sealing interface, which permits optimum hydrodynamic film thickness, thereby significantly lowering the self-generated heat produced by the seal, as compared to the prior art. The cool-running nature of the present invention permits the use of higher modulus seal materials and higher surface speeds, compared to the prior art, and allows the seal to operate in applications with relatively poor heat dissipation. The controlled interfacial contact pressure of the present invention also permits effective hydrodynamic lubrication with lower viscosity lubricants, including water.

20 Claims, 6 Drawing Sheets

HYDRODYNAMICALLY LUBRICATED ROTARY SHAFT SEAL WITH ENVIRONMENTAL SIDE GROOVE

FIELD OF THE INVENTION

This invention relates generally to lubricated seals for apparatus that is used in a contaminated environment and has a rotary member such as a shaft or housing that is exposed to the contaminated environment. More specifically the present invention concerns a hydrodynamically lubricated rotary shaft seal for location within a housing containing a lubricant and which functions as a sealing partition between the lubricant and the contaminated environment. Even more specifically, the present invention concerns a hydrodynamically lubricated rotary seal having a geometry that causes the seal to minimize its interfacial contact pressure with a relatively rotatable surface such as a rotary shaft or housing to enhance seal wear life under high pressure operating conditions in a contaminated environment.

BACKGROUND OF THE INVENTION

It is widely understood that the higher the modulus of elasticity of an interference-type seal, the more resistant the seal is to high pressure extrusion damage. Likewise, it is well known that up to a certain point, the abrasion and compression set resistance of a given elastomer type generally increases as a function of its modulus of elasticity. The use of higher modulus elastomer materials is therefore desirable in hydrodynamic rotary shaft seals from a standpoint of optimizing extrusion, abrasion, and compression set resistance.

Hydrodynamically lubricated seals are typically installed with initial radial compression to establish a static seal in the same manner as is typical for O-Ring seals. A certain minimum level of initial compression is required so that the seal can accommodate normal tolerances, eccentricities, shaft lateral displacement, and seal compression set without losing sealing contact with the shaft.

The contact pressure at the seal to shaft interface is one of several important factors controlling the hydrodynamic performance of hydrodynamic seals because it directly influences hydrodynamic film thickness, which in turn influences the shear rate of the lubricant film and the amount of asperity contact between the seal and shaft (if any), and therefore influences the magnitude of heat generated at the dynamic interface. With the prior art single modulus seals of U.S. Pat. Nos. 4,610,319 and 5,230,520, the contact pressure at the dynamic sealing interface is a function of the percentage of compression times the modulus of elasticity of the seal material, therefore, the choice of modulus has been limited by the maximum practical interfacial contact pressure and resulting level of self-generated heat. In practice, this has meant that the prior art hydrodynamic seal of single modulus construction has been restricted to materials having a modulus of elasticity of about 2,600 psi, which corresponds to a durometer hardness of about 90 Shore A. Such high durometer prior art seals have effectively been limited to applications where efficient cooling is provided by the installation, such as in downhole mud motors where a liquid circulating through the rotary shaft efficiently draws heat away from the seals.

The subject matter set forth in U.S. patent application Ser. No. 08/582086 is an improvement of the hydrodynamic seals described in U.S. Pat. Nos. 4,610,319 and 5,230,520 which incorporates composite multiple modulus construction and a non-planar flexible environmental edge heel geometry which cooperate to resist high pressure extrusion damage while minimizing interfacial contact pressure. FIG. 3 represents the radially uncompressed cross-sectional shape of the prior art seal 136 of U.S. application Ser. No. 08/582086, and FIG. 3A represents the cross-sectional configuration of the prior art seal 136 when located within its seal groove 134 and radially compressed between the outer diameter 158 of the rotary shaft 132 and the radially outer wall 154 of the seal groove 134. The hydrodynamic rotary shaft seal of Ser. No. 08/582086 is provided with a wavy shape 160 on the lubricant side of the dynamic sealing lip 156 for the purpose of hydrodynamic lubrication of the dynamic sealing interface, and has an abrupt non-axially varying edge 162 on the environmental side of the dynamic sealing lip for the purpose of excluding contaminants present in the environment 140 per the teachings of U.S. Pat. No. 4,610,319. The seal serves as a partition between the lubricant 138 and the environment 140.

The dynamic sealing lip 156 is an element of the inner portion 164 of the seal which is constructed wholly or in part from a relatively hard, relatively high modulus extrusion resistant material (such as a polymeric material, a high durometer elastomer, or reinforced material such as a fiber or fabric reinforced elastomer or a fiber, glass particle, or metal-particle reinforced plastic) so that the portion of the dynamic sealing lip closest to the shaft to housing extrusion gap 167 resists extrusion under high pressure. Another larger integral portion 166 of the seal is constructed wholly or in part from a relatively softer, low modulus, resilient material, such as a low durometer elastomer. When the seal is installed, it is placed in radial compression, and the contact pressure at the dynamic sealing interface is governed by the relatively low modulus of the relatively soft, resilient material rather than by the relatively high modulus of the relatively hard, extrusion resistant material of the dynamic sealing lip.

The portion of the seal near the shaft to housing extrusion gap incorporates a transitional, non-planar circular flexible environmental end transitional heel geometry 174 defined by a circular transitional surface between the planar environmental end surface 144 of the seal and the cylindrical inner peripheral sealing surface 146 of the dynamic sealing lip. Lubricant pressure causes this non-planar transitional heel geometry to flex toward the shaft to housing extrusion gap 167, rather than forcing it to extrude or bulge into the extrusion gap. As a result, the transitional geometry intersects the housing environmental gland wall 150 at a location remote from the cylindrical surface 158 of the shaft 132, and intersects the peripheral sealing surface 146 of the dynamic sealing lip at a location remote from the environmental end surface 144. Thus the generally unavoidable relative lateral motion between the housing and the shaft is absorbed over a relatively long axial distance by flexing of the transitional geometry. Since the relative shaft 132 to housing 130 lateral motion is absorbed over a relatively long distance, the resulting local stresses in the seal material are relatively low, and do not exceed the fatigue limit of the material used to form the dynamic sealing lip. Extrusion damage is therefore prevented, and integrity of the environmental end of the seal is therefore maintained. The transitional geometry also helps to keep the seal away from sharp, potentially burred corner 176 of the gland, which would otherwise tend to cut the seal.

The ring shaped interference type rotary shaft seals embodying the principles set forth in U.S. Pat. Nos. 4,610,319 and 5,230,520 and application Ser. No. 08/582086 are marketed by Kalsi Engineering, Inc. of Sugar Land, Tex. under the registered trademark, Kalsi Seals, and are employed in diverse rotary applications to provide lubricant retention and contaminant exclusion in harsh environments. All references herein to hydrodynamically lubricated seals or hydrodynamic seals are directed to seals embodying one or more of the principles of U.S. Pat. Nos. 4,610,319 and 5,230,520 and application Ser. No. 08/582086.

FIGS. 1, 1A, 2, 3 and 3A of this specification represent prior art which is discussed herein to enhance the readers' understanding of the distinction between prior art Kalsi Seals and the present invention. FIG. 1 represents the radially uncompressed cross-sectional shape of the prior art seal 5 of U.S. Pat. No. 5,230,520, and FIG. 1A represents the cross-sectional configuration of the prior art seal 5 when located within its seal groove and radially compressed between the outer diameter 14 of the rotary shaft 3 and the radially outer wall 11 of the seal groove, and FIG. 2 shows a seal contact footprint made by the peripheral sealing surface 13 of the dynamic sealing lip 12 against the shaft. Referring now to the prior art of FIG. 1A, there is shown a cross-sectional view of a hydrodynamically lubricated interference type rotary shaft sealing assembly including a housing 2 from which extends a rotary shaft 3. The housing defines an internal seal installation groove, seat or gland 4 within which is located a ring shaped hydrodynamic Kalsi Seals rotary shaft seal 5 which is constructed in accordance with the principles of the above mentioned patents. The hydrodynamic seal is used to separate the lubricant 6 from the environment 7, and to prevent intermixing of the lubricant and the contaminant matter present within the environment. The environment may contain abrasive particulate matter in a fluid or atmosphere. From an overall orientation standpoint, the end of the seal which is oriented toward the lubricant is surface 8 and the end of the seal which is oriented toward the environment 7 is end surface 9.

When the seal 5 is installed in the circular seal groove or seat 4, a circular radially protruding static sealing lip or projection 10 is compressed against a counter-surface 11 of the groove per the teachings of U.S. Pat. No. 5,230,520. At the inner periphery of the circular sealing element 5 there is provided an inner circumferential sealing lip 12 that defines a peripheral dynamic sealing surface 13 that is compressed against a counter-surface 14 of the rotatable shaft 3. The circular seat or seal groove 4 is sized to hold the resilient circular sealing element 5 in radial compression against the cylindrical sealing surface 14 of the shaft 3, thereby initiating a static seal with the housing and shaft in the same manner as any conventional interference type seal, such as an O-Ring. When shaft rotation is not present, a liquid tight seal is maintained at the static sealing interface between the static sealing lip 10 and the mating counter-surface 11 of the seat, and between the dynamic sealing lip 12 and the counter-surface 14 of the shaft.

When shaft rotation takes place, the hydrodynamic seal remains stationary with respect to the housing, and maintains a static sealing interface with said housing, while the seal-to-shaft interface becomes a dynamic sealing interface. The inner peripheral surface of the seal inner lip 12 incorporates a geometry that promotes long seal life by hydrodynamically lubricating the dynamic seal-to-shaft interfacial zone, and by excluding environmental contaminates from the seal to shaft interface. Seal lip 12 incorporates a wavy edge 15 on its lubricant side, and an abrupt circular axially nonvarying edge 16 on its environmental side per the teachings of U.S. Pat. No. 4,610,319. For the purpose of orienting the reader, the radial cross-sections of FIGS. 1 and 1A are taken at a circumferential location which represents the median width of the seal contact footprint shown in FIG. 2. As relative rotation of the shaft takes place, the wavy edge 15 on the lubricant side of the dynamic sealing lip, which has a gradually converging relationship with the shaft in the axial direction, generates a hydrodynamic wedging action that introduces a lubricant film between the seal peripheral sealing surface 13 and the counter-surface 14 of the shaft per the teachings of U.S. Pat. No. 4,610,319. This lubricant film physically separates the seal and the shaft, and thereby prevents the typical dry rubbing type frictional wear and heat damage associated with conventional non-hydrodynamic interference type seals, and thereby prolongs seal life and mating shaft surface life and makes higher service pressures practical. This hydrodynamic action, which is described in detail in U.S. Pat. No. 4,610,319, can more easily be understood by referring to FIG. 2, which shows a flat development of the cylindrical sealing surface 14 of the shaft, and which depicts the axially varying seal contact footprint of the dynamic inner lip 12 of the seal against the sealing surface 14 of the shaft. In the absence of relative rotation, the seal contact footprint is a static sealing interface between the seal and shaft, and in the presence of rotation, the seal contact footprint is a dynamic sealing interface between the seal and shaft. From an orientation standpoint, the lubricant is shown at 6, the seal footprint is shown at 17, and the environment is shown at 7. The lubricant side of the seal contact footprint has a wavy edge 18 created by the wavy edge 15 of the seal, and the mud side of the seal contact footprint has a straight edge 19 created by the abrupt axially non-varying edge 16 of the seal. The lubricant is pumped into the dynamic sealing interface by the normal component VN of the rotational velocity V. Interrelation of the axially nonvarying edge 19 and wavy edge 18 provide the seal contact footprint with a maximum axial width as shown at $W_1$ and a minimum axial width as shown at $W_2$, and with a median axial width being midway in axial length between $W_1$ and $W_2$ as shown at $W_3$ in FIG. 2.

Referring again to FIG. 1 and FIG. 1A, the abrupt axially nonvarying edge 16 of the environmental side of the seal is not axially varying, and does not generate a hydrodynamic wedging action with the environment in response to relative rotary motion, and thereby functions to exclude particulate contaminants from the seal-to-shaft interface per the teachings of U.S. Pat. No. 4,610,319.

The illustration of FIGS. 1 and 1A illustrates the customary type of general purpose Kalsi Seals rotary shaft seal that positions and configures the abrupt axially nonvarying exclusionary edge 16 and the environmental end surface 9 of the seal 5 in such a manner that lip 12 is largely supported by the environment-side gland wall 20 in a manner that resists distortion and extrusion of seal material when the seal is subjected to the hydrostatic force resulting from the lubricant pressure acting over the annular area between the static sealing interface and the dynamic sealing interface. Such force occurs when the lubricant pressure is higher than the environment pressure. FIG. 1A illustrates the seal being forced against the environment-side gland wall 20 by hydrostatic force resulting from the lubricant pressure acting over the area between the static sealing interface and the dynamic sealing interface.

The static sealing lip 10 has generally the same cross-sectional geometry as the average cross-sectional configuration of the dynamic sealing lip 12 except that may be shorter. Because both lips have the same general shape and axial location, when the seal is compressed, the interfacial contact force profiles and deformation of the two lips are very similar in both their magnitude and axial location per the teachings of U.S. Pat. No. 5,230,520, and as a result, there is no gross tendency for the seal to twist counter-clockwise within the gland in the absence of lubricant pressure.

When a condition of elevated lubricant pressure exists, the hydrostatic force resulting from the lubricant pressure acting over the area between the static sealing interface and the dynamic sealing interface drives the seal against the environment side gland wall, as shown by FIG. 1A. The abrupt circular axially nonvarying exclusion edge 16 is located at the extreme end of the environmental side of the seal. Since the shape of the environmental end surface 9 of the seal is of the same planar shape as the environmental gland wall, the environmental end surface 9 of the seal is generally well supported against the lubricant pressure at all locations except clearance gap 26 which exists between the housing 2 and shaft 3. This clearance gap, which is commonly called the "extrusion gap", must be kept relatively small so that the relatively low modulus seal material can bridge the gap and resist the force resulting from the lubricant pressure acting over the unsupported area of the extrusion gap. At some level of elevated lubricant pressure, the portion of the seal adjacent to extrusion gap 26 begins to locally bulge or protrude in to the extrusion gap. This phenomenon is commonly called "extrusion" by the seal industry, and is inherent to interference type seals, including the Kalsi Seals rotary shaft seal. (Extrusion is not illustrated in FIG. 1A.)

The magnitude of extrusion is directly dependent upon several factors, including the size of the extrusion gap, the lubricant pressure, and the modulus of the seal material, which usually diminishes at elevated temperature. In pressure retaining sealing applications, extrusion can lead to severe fatigue damage known as "nibbling" or "extrusion damage", which can cause seal material loss and thereby significantly reduce the operational life of the seal. Extrusion damage is caused by cyclic stressing of the seal material which protrudes into the extrusion gap, which ultimately causes the protruding material to fatigue and break away from the sealing element. The cyclic stress which causes extrusion damage is induced by several factors described here-after. Dynamic fluctuations in the size of the extrusion gap due to lateral shaft motion (and other factors) causes high variations in the radial compression of the extruded material, and the resulting cyclic stress causes extrusion damage which looks as if tiny bites have been "nibbled" out of the environmental side of the seal. Lubricant pressure fluctuations cause cyclic stress induced extrusion damage by causing fluctuations in the magnitude of extrusion, and by causing fluctuations in the size of the extrusion gap due to "breathing" (pressure related expansion and contraction) of the housing. Experience has shown that extrusion damage is significantly accelerated by the presence of roughness (such as nicks, burrs, or poor surface finish) at the intersection 27 between the environmental side gland wall 20 and the housing bore 28, because said roughness causes the extruded material to incur a high local stress concentration that accelerates fatigue damage. Extrusion related fatigue damage to the environmental side of the seal can cause eventual seal failure by several different mechanisms. In severe cases, the seal fails catastrophically due to gross material loss. In less severe cases, localized nibbling can promote the ingestion of environmental abrasives into the dynamic interface and cause eventual seal failure due to wear, and can also partially interrupt the hydrodynamic film which may cause the seal to run hotter and suffer from premature compression set and heat-related surface embrittlement.

SUMMARY OF THE INVENTION

The present invention is a hydrodynamically lubricated, interference type rotary shaft seal which incorporates the self lubricating and exclusionary features of the seal disclosed in U.S. Pat. No. 4,610,319, and addresses the same general concerns as U.S. application Ser. No. 08/582086, but in a much simpler embodiment. In the present invention, interfacial contact pressure is controlled and minimized by the simple incorporation of an environment-end groove which renders the environmental end of the seal more flexible and thereby partially relieves the compressive forces reacted at the dynamic sealing interface and thereby provides for control of the lubricant film thickness at the dynamic sealing interface. The depth of the environment-end groove can be optionally varied in sequence with the hydrodynamic wave to provide even more precise control of interfacial contact pressure.

Compared to the prior art seals of single modulus construction, the present invention promotes cooler operation and provides the increased extrusion resistance associated with harder materials without a corresponding increase in interfacial contact pressure, thereby accommodating higher service pressure, thinner lubricants such as water, and increased shaft to housing clearance. The hydrodynamic rotary shaft seal of this invention is provided with a wavy shape on the lubricant side of the dynamic sealing lip for the purpose of hydrodynamic lubrication of the dynamic sealing interface, and has an abrupt non-axially varying shape on the environmental side of the dynamic sealing lip for the purpose of excluding contaminants. More specifically, the hydrodynamic seal of this invention is an improvement to the commercially available type of hydrodynamic rotary shaft seal which is manufactured and sold by Kalsi Engineering, Inc. of Sugar Land, Tex. under U.S. Pat. Nos. 4,610,319 and 5,230,520 and U.S. application Ser. No. 08/582,086. The improved extrusion resistance of the present invention is accomplished by the cooperative benefits of the high modulus construction made possible by the environment side groove, and by a non-planar flexible environmental end transitional heel geometry of the type disclosed in U.S. application Ser. No. 08/582,086.

The environment side groove provides the extrusion resistance benefit of higher modulus materials without the usual associated penalty of high interfacial contact pressure. When the seal is installed, it is placed in radial compression, and the contact pressure at the dynamic sealing interface is governed by the geometry of the radially spaced flexible generally circular body rims rims of the seal which result from the shape and depth of the environment side groove, while the extrusion resistance is governed by the modulus of the material used in construction of the seal, and by the shape of the exclusionary geometry. By employing a generally circular hydrodynamic seal having an environment groove at one axial end and thus defining radially spaced generally circular flexible body rims at the environment end, the present invention facilitates exploitation of rather hard, i.e., high durometer elastomer sealing materials for hydrodynamic sealing which would otherwise be unsuitable for use in conventional interference seals from the standpoint of interfacial contact pressure because of incompatability with interfacial hydrodynamic film generation especially under conditions of high lubricant pressure.

The portion of the seal near the shaft to housing extrusion gap incorporates a transitional, non-planar circular flexible transitional heel geometry between the planar environmental end surface of the seal and the cylindrical inner peripheral sealing surface of the dynamic sealing lip of the type disclosed in U.S. application Ser. No. 08/582086. Lubricant pressure causes this transitional geometry to flex toward the shaft to housing extrusion gap, rather than forcing it to extrude or bulge into the extrusion gap. As a result, the non-planar transitional heel geometry drapes between the housing environmental gland wall and the cylindrical surface of the shaft, and the generally unavoidable relative lateral motion between the housing and the shaft is absorbed over a relatively long distance by flexing of the transitional geometry. Since the relative shaft to housing lateral motion is absorbed over a relatively long distance, the resulting local stresses in the seal material are relatively low, and do not exceed the fatigue limit of the material used to form the dynamic sealing lip. Extrusion damage is therefore prevented, and integrity of the environmental end of the seal is therefore maintained.

Since the transitional, non-planar flexible heel geometry between the planar environmental end of the seal and the cylindrical inner periphery of the dynamic sealing lip is of an abrupt non-axially varying nature, no hydrodynamic pumping activity can occur at the environmental end of the seal responsive to shaft rotation, which serves to prevent invasion of the dynamic sealing interface by environmental contaminants.

Experiments conducted by the inventor and his associates have continued that the reduced interfacial contact pressure provided by the groove can be engineered to enable the seal to run with extremely low viscosity lubricants, such as water, without having the lubricant film flash to steam and collapse. In these experiments, the seals have run with water as the lubricant for thousands of hours. It is anticipated that the present invention will provide the enabling technology for a new generation of low cost centrifugal pump seals where water is the preferred seal lubricant because of process fluid contamination concerns.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention admits to other equally effective embodiments.

In the drawings.

DETAILED DESCRIPTION OF PREFERRED EMBODIMENT

Figure 4:
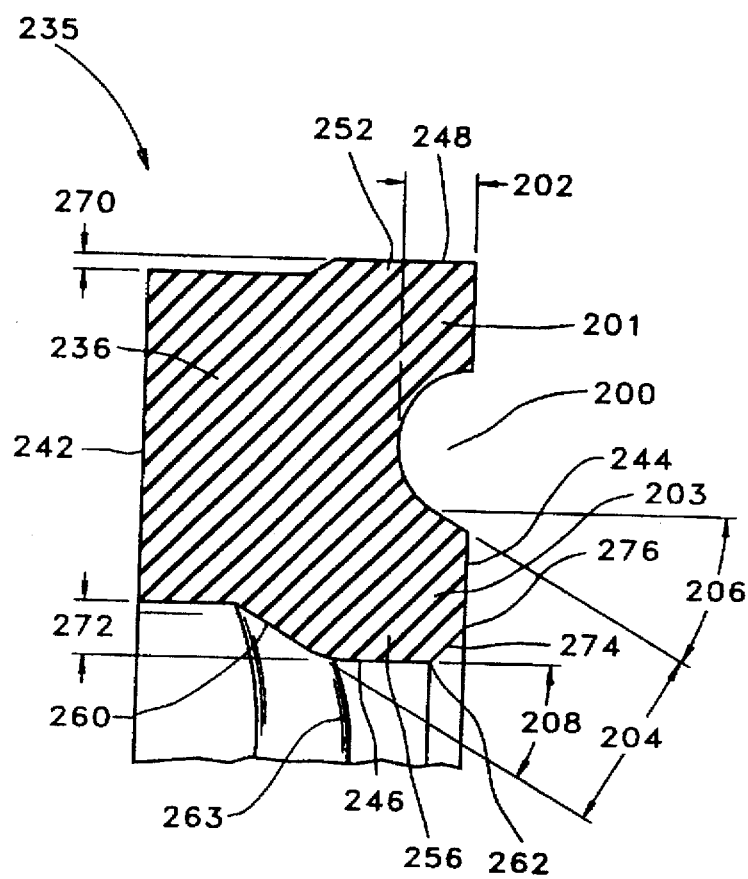
FIGS. 4 and 4A are fragmentary cross-sectional illustrations of a hydrodynamic rotary shaft seal representing the preferred embodiment of the present invention, with FIG. 4 showing the uncompressed condition of the seal and FIG. 4A representing the compressed condition of the seal within the gland when exposed to lubricant pressure.
Figure 4A:
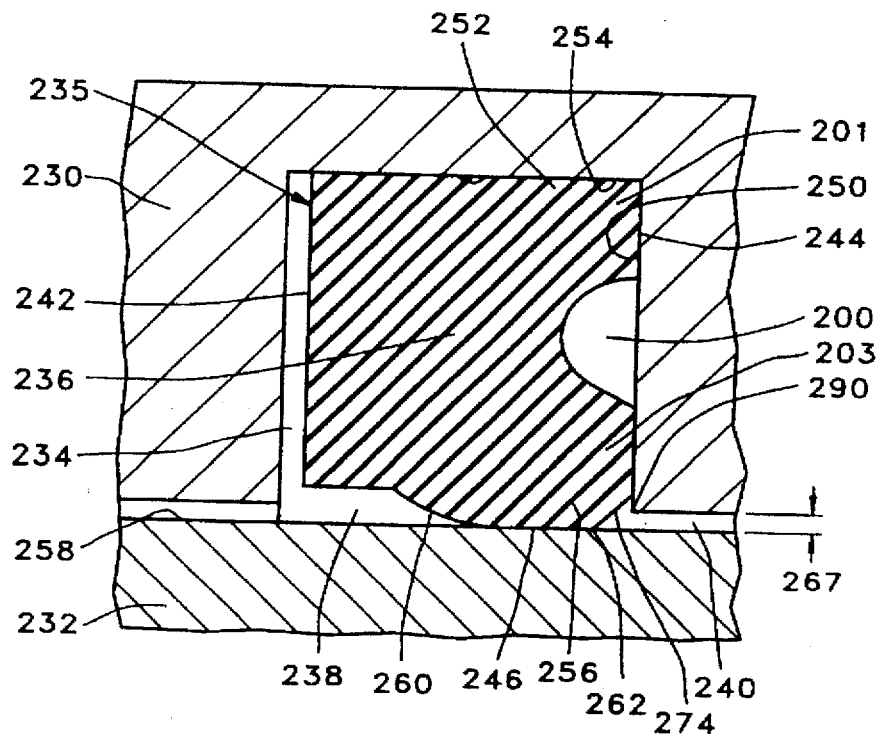

Referring now to the drawings, FIGS. 4 and 4A represent the preferred embodiment of the invention. FIG. 4A is a fragmentary view which represents the cross-sectional configuration of the seal of the present invention when located within its seal groove and radially compressed between the rotary shaft and the radially outer wall of the seal groove under conditions where the lubricant pressure is higher than the environment pressure, and FIG. 4 is a fragmentary cross-sectional view representing the uncompressed condition of the seal.

In FIG. 4A there is shown a cross-sectional view of a sealed rotary shaft assembly including a housing 230 from which extends a rotary shaft 232. The housing defines an internal seal installation groove, seat or gland 234 within which is located a ring shaped hydrodynamic rotary shaft sealing element, shown generally at 235, which is constructed in accordance with the principles of the present invention, add is referred to herein as a hydrodynamic seal. The hydrodynamic seal 235 is defined principally by a circular seal body 236.

The hydrodynamic seal 235 is used to separate the lubricant 238 from the environment 240, and to prevent intermixing of the lubricant and the contaminant matter present within the environment. From an overall orientation standpoint, the axial end of the circular seal body 236 of sealing element 235 which is oriented toward the lubricant is axial end surface 242 and the axial end of the seal which is oriented toward the environment 240 is axial end surface 244, the inner diameter or periphery of the seal is represented by a peripheral sealing surface 246, and the outer diameter or periphery is represented by a circular static outer peripheral sealing surface 248. The compressed configuration of the seal shown in FIG. 4A is representative of its shape and position within the gland when the pressure of the lubricant 238 is higher than that of the environment 240, and the pressure of the lubricant forces the environmental end surface 244 of the seal against the environment-side gland wall 250.

Figure 1:
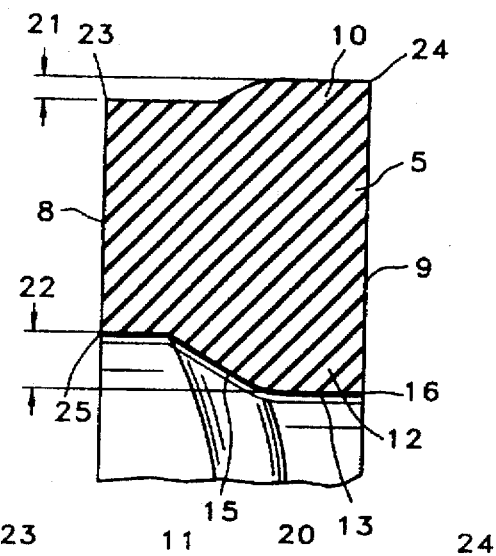
FIGS. 1 and 1A are fragmentary sectional views of a hydrodynamic seal representing the prior art of U.S. Pat. No. 5,230,520, the seal being shown in the uncompressed condition thereof in FIG. 1, and shown in FIG. 1A to be located in radially compressed condition within a sealing gland and establishing hydrodynamic sealing engagement with a rotary shaft in the presence of lubricant pressure.
Figure 1A:
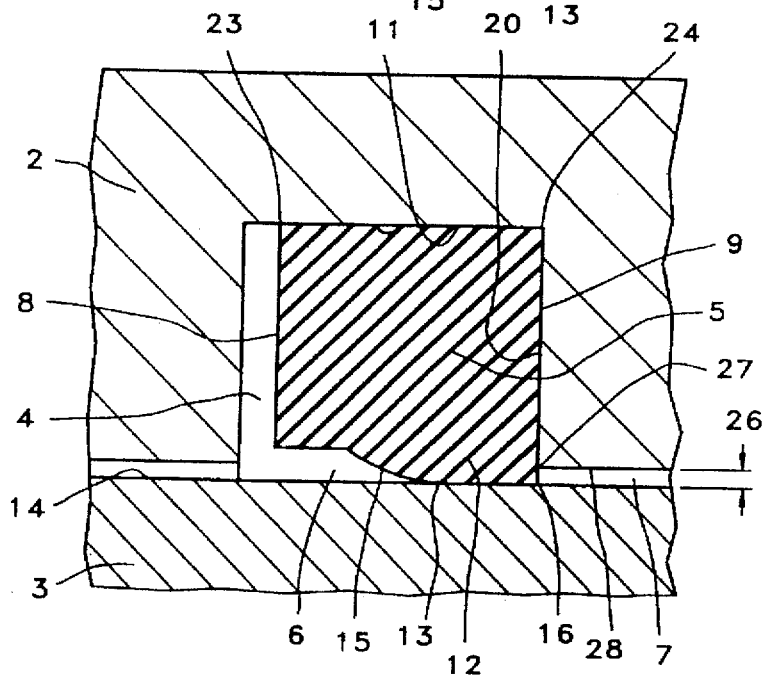
Figure 2:
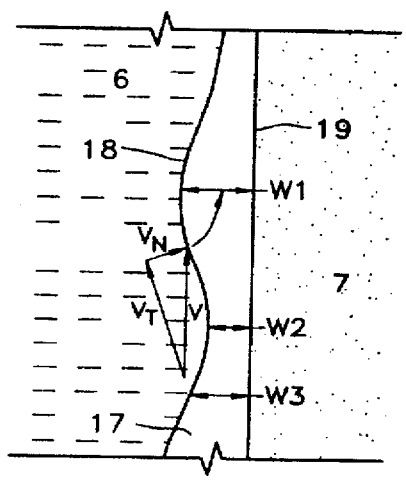
FIG. 2 is a flat development which represents the seal contact footprint configuration of the sealing interface of a prior art hydrodynamic seal which incorporates the teachings of U.S. Pat. No. 4,610,319, and which illustrates the theoretical generation of the hydrodynamic wedging or pumping action thereof.
Figure 3:
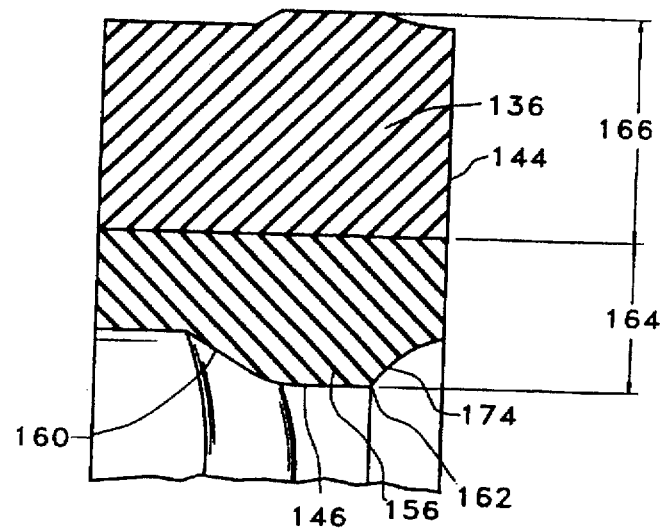
FIGS. 3 and 3A are fragmentary sectional views of a hydrodynamic seal representing the prior art of U.S. application Ser. No. 08/582086, the seal being shown in the uncompressed condition thereof in FIG. 3, and shown in FIG. 3A to be located in radially compressed condition within a sealing gland and establishing hydrodynamic sealing engagement with a rotary shaft in the presence of lubricant pressure.
Figure 3A:
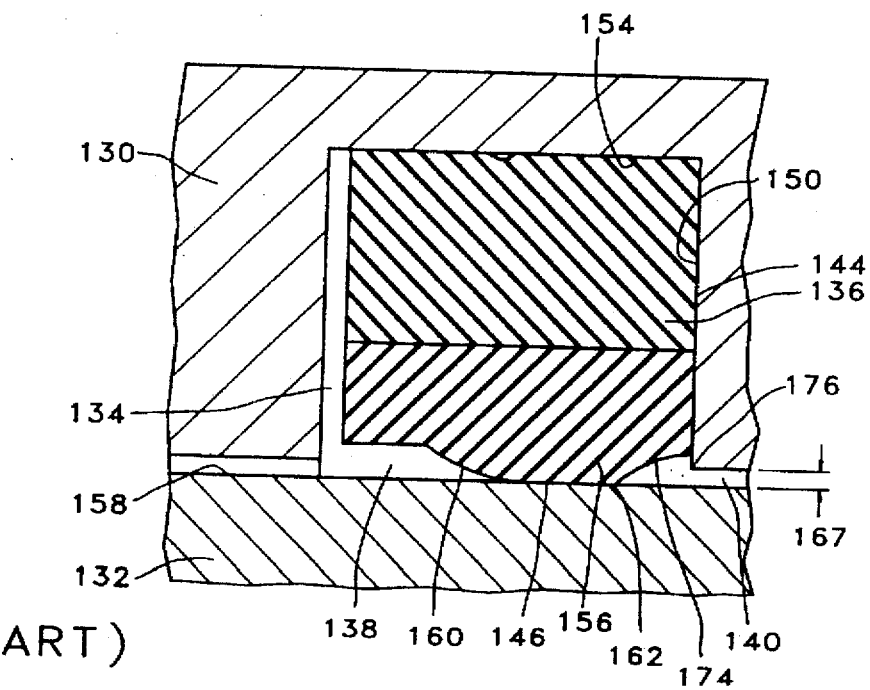

At the inner periphery of the circular sealing element 235 there is provided an inner peripheral protuberance or lip 256 that defines a peripheral sealing surface 246 that is compressed against a counter-surface 258 of the rotatable shaft 232. The peripheral sealing surface 246 is axially varying in width throughout its circumference so that it defines a seal contact footprint axially varying in width defined by the circumferential configuration of the peripheral sealing surface 246. The abrupt circular axially non-varying edge 262 corresponds to the axially non-varying edge 16 of FIGS. 1 and 1A and 19 of FIG. 2. The wavy inner circumferential edge 263 corresponds to the axially varying or wavy circumferential edge 18 shown in the flat development illustration of FIG. 2. Within the spirit and scope of the present invention, the seal contact footprint of the peripheral sealing surface 246, with the rotatable shaft 232 may take the form shown by FIG. 2. Being axially varying in width throughout its circumference in the manner best shown in FIG. 2 the seal contact footprint surface 246 defines a maximum axial width, represented by $W_1$ in FIG. 2, a minimum axial width $W_2$ and a median axial width being midway in axial length between $W_1$ and $W_2$ as shown at $W_3$ in FIG. 2.

When the seal 235 is installed in the circular seal groove or seat 234, a circular radially protruding static sealing lip 252 is compressed against a counter-surface 254 of the groove per the teachings of U.S. Pat. No. 5,230,520. The static lip approximates the average shape of the dynamic lip 256, but the projection 270 of the static lip does not necessarily equal projection 272 of the dynamic lip. The circular seat or seal groove 234 is sized to hold the resilient circular sealing element 235 in radial compression against the cylindrical sealing surface 258 of the shaft 232, thereby initiating a static seal with the housing and shaft in the same manner as any conventional interference type seal, such as an O-Ring. When shaft rotation is not present, a liquid tight seal is maintained at the static sealing interface between the static sealing lip 252 and the mating counter-surface 254 of the seat, and between the inner peripheral sealing surface 246 of the dynamic sealing lip 256 and the counter-surface 258 of the shaft 232.

When shaft rotation takes place, the hydrodynamic seal remains stationary with respect to the housing and maintains a static sealing interface with said housing, while the seal-to-shaft interface becomes a dynamic sealing interface. The inner lip 256 incorporates a special geometry that promotes long seal life by hydrodynamically lubricating the dynamic seal-to-shaft interfacial zone, and by excluding environmental contaminates from the seal to shaft interface; this special geometry consists of a wavy, axially varying edge 260 on the lubricant side of the lip and a circular, abrupt non-axially varying edge 262 on the environmental side of the lip per the teachings of U.S. Pat. No. 4,610,319. From an overall orientation standpoint, FIGS. 4 and 4A are taken at a circumferential location which represents the median axial width of the seal contact footprint, which corresponds to the median wave height of the hydrodynamic lubrication geometry described in U.S. Pat. No. 4,610,319 and herein in FIG. 2. The geometry of the hydrodynamic inlet geometry can take any one of many suitable forms that result in a gradually converging, axially varying shape at the lubricant side of the dynamic sealing lip without departing from the spirit or scope of the present invention.

The abrupt circular non-axially varying edge 262 of the environmental side of the dynamic sealing lip is not axially varying, and does not generate a hydrodynamic wedging action with the environment in response to relative rotary motion, and thereby functions to exclude particulate contaminants from the seal-to-shaft interface per the previously described teachings of U.S. Pat. No. 4,610,319.

The improved extrusion resistance of the present invention is accomplished by using a relatively hard, high modulus material (such as a flexible polymeric material or a high modulus elastomer) for construction of the seal body in conjunction with a non-planar flexible environmental end transitional heel geometry 274 per the teachings of U.S. application Ser. No. 08/582086. The use of a relatively hard, high modulus material is made possible by the presence of an environmental groove 200 which separates the environmental end of the hydrodynamic seal into radially spaced inner and outer generally circular body rims 201 and 203, which, by virtue of the radial dimension thereof, are flexible and thereby deflect radially inwardly toward the circular environmental groove 200. The flexibility of the circular body rims relieves some of the contact pressure at the dynamic sealing interface between lip 256 and counter-surface 258 that would otherwise occur if no environment groove were present, thereby assuring sufficient hydrodynamic lubrication. The depth 202 of the groove and thickness 204 of the internal flexible body rim 203 are engineered to provide the desired dynamic seal to shaft interfacial contact pressure for a given installation, considering the pressure of the lubricant, environment, and the liquid used to lubricate the seal, and the heat dissipation characteristics of the operating environment. The contact pressure at the seal to shaft interface is one of several important factors controlling the hydrodynamic film thickness which in turn influences the shear rate of the lubricant, the aperity contact between the seal and shaft, and the magnitude of self-generated heat. The depth 202 of the groove 200 can be varied in sequence with the wavy axially varying edge 260 to provide optimum control of seal to shaft contact pressure. Experiments performed by the inventors and their associates have shown that the seal is capable of high pressure service, and also capable of exploiting thin lubricants, such as water, while providing suitable lubrication of the dynamic sealing interface.

In the uncompressed, as-manufactured state, the aforementioned non-planar flexible environmental end transitional heel geometry 274 extends from abrupt circular non-axially varying edge 262 to corner 276 which is defined at the intersection with environmental end surface 244. Because of the circular, non-axially varying environmental edge configuration of abrupt non-axially varying edge 262, the seal does not generate a hydrodynamic wedging action with the environment in response to relative rotary motion of the shaft, and thereby functions to exclude particulate contaminants from the seal-to-shaft interface per the teachings of U.S. Pat. No. 4,610,319.

The non-planar flexible environmental end transitional heel geometry 274 provides the seal with significant advantages over the prior art of U.S. Pat. Nos. 4,610,319 and 5,230,520, as described hereafter. The modulus of the material used in construction of the prior art high pressure seals of U.S. Pat. Nos. 4,610,319 and 5,230,520 were limited to relatively low values which upon radial compression did not cause excessive interfacial contact pressure, therefore the environmental end of the seal was necessarily given a planar shape so that it was supported by the planar shape of the gland wall against lubricant pressure. This meant that high lubricant pressure could make the material adjacent to the extrusion gap bulge into the extrusion gap and receive extrusion type damage. With the present invention, wherein the seal can be constructed of a hard, stiff, high modulus flexible material, the axial force imposed by lubricant pressure may non-planar flexible environmental end transitional heel geometry 274 to flex toward the shaft to housing extrusion gap 267, but does not force it to extrude or bulge into the extrusion gap. The environmental side of the seal is therefore protected from fatigue resulting from contact with the potentially sharp, rough corner 290, and is protected from fatigue which can result from being repeatedly forced to into the extrusion gap 267 past sharp corner 290.

Compared to the prior art of U.S. application Ser. No. 08/582086, this seal has a significant cost advantage because it is made from a single material, and therefore only requires a single molding step. As a result, a seal of the present invention costs approximately ¼ that of the prior art of U.S. application Ser. No. 08/582086 to manufacture. The prior art seals of U.S. application Ser. No. 08/582086 could possibly be subject to separation at the interface between the two different materials; no such potential weakness is present in the seal of the present invention because it can be constructed of a single material while achieving the same reduction in interfacial contact pressure as the prior art seal of U.S. application Ser. No. 08/582086. To facilitate manufacture, it is preferred that the flank angle 206 of groove 200 match or approximate the flank angle 208 of dynamic sealing lip 256 is not interlocked with the mold cavity during manufacture. The inventors have found that the depth 202 of the groove shape can be as much as the maximum axial width $W_1$ of the seal contact footprint at the maximum height of the wave.

This invention has application where rotary shafts are sealed with respect to a housing with either the housing or the shaft being the rotary member. The projecting dynamic and static sealing lips can be on the inside and outside of the seal cross-sectional shape when the seal is compressed in the radial direction, with the dynamic lip being located on either the inner or the outer periphery. Alternately, the projecting dynamic and static sealing lips can be on opposite ends of the seal cross-sectional shape when the seal is compressed in an axial direction against relatively rotating planar countersurfaces.

DESCRIPTION OF ALTERNATIVE EMBODIMENTS

Figure 5:
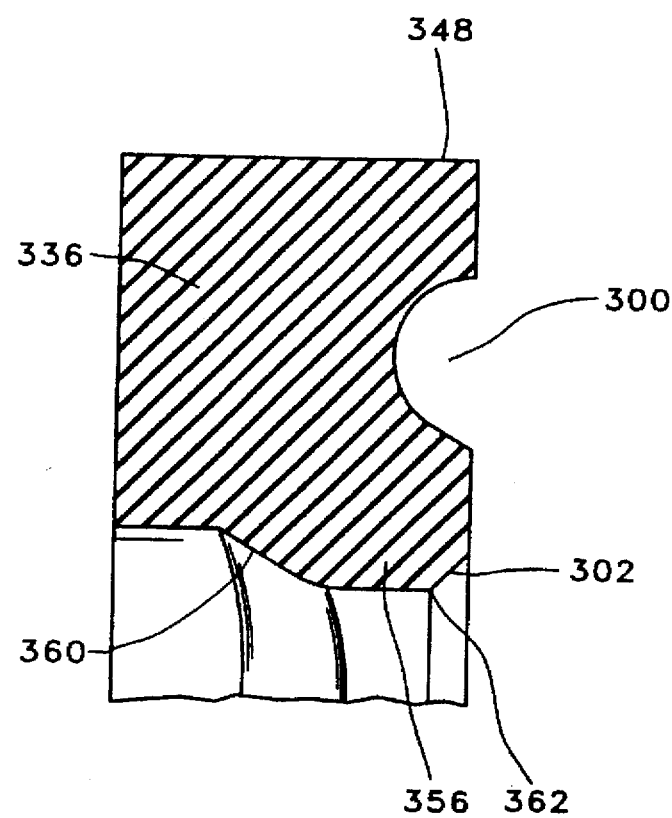
FIG. 5 is a fragmentary sectional view which illustrates a simplified alternate embodiment of the invention wherein the static sealing lip of the preferred embodiment is omitted, the outer sealing periphery being of a simple cylindrical configuration.

FIG. 5 illustrates a simplified alternate embodiment of the invention wherein the static sealing surface is provided by a non-projecting periphery 348 rather than by the projecting static lip of the preferred embodiment. While this configuration does subject the dynamic inner lip 356 to more compression-induced distortion, it is still afforded significantly increased extrusion resistance and relatively low interfacial contact pressure by virtue of the cooperative benefits of the non-planar flexible transitional heel geometry 302 and environmental end groove 300. As with the preferred embodiment, the resilient seal body 336 incorporates a dynamic sealing lip 356 which incorporates an axially varying hydrodynamic edge 360 and an abrupt circular non-hydrodynamic axially nonvarying exclusionary edge 362.

Figure 6:
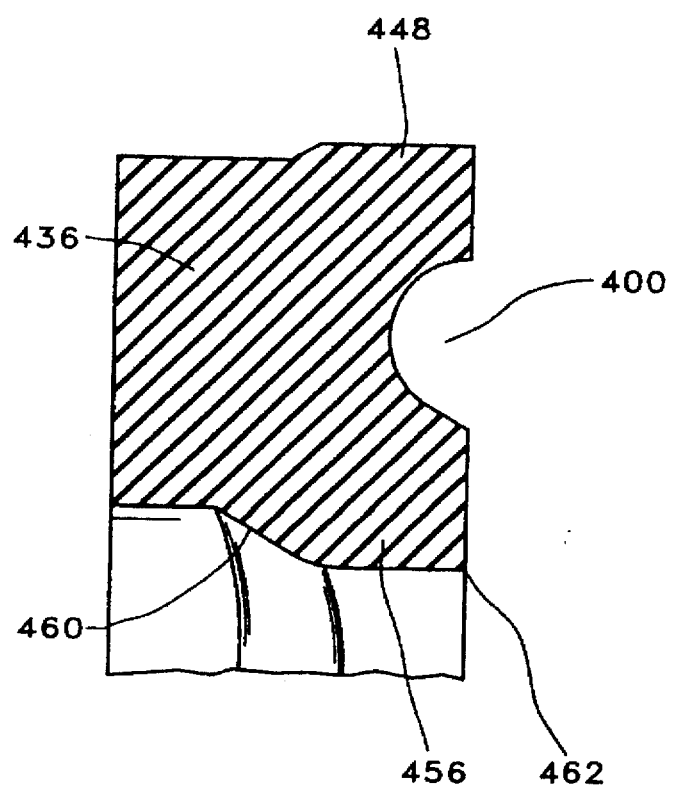
FIG. 6 is a fragmentary sectional view which illustrates a simplified alternate embodiment of the invention wherein the non-planar flexible transitional heel geometry of the preferred embodiment is omitted, the exclusionary feature being of a sharp circular axially nonvarying corner.

A significant reduction in interfacial contact pressure can be had over the prior art hydrodynamic seal by employing a seal having alternate embodiment as shown in FIG. 6, wherein the environmental end groove 400 can be employed without the non-planar flexible environmental end transitional heel geometry of the preferred embodiment, the exclusionary geometry instead being defined by an abrupt non-axially varying edge 462. As with the preferred embodiment, the resilient seal body 436 incorporates a static sealing lip 448 and a dynamic sealing lip 456 which incorporates an axially varying hydrodynamic edge 460 as well as the abrupt circular non-axially varying edge 462.

Figure 7:
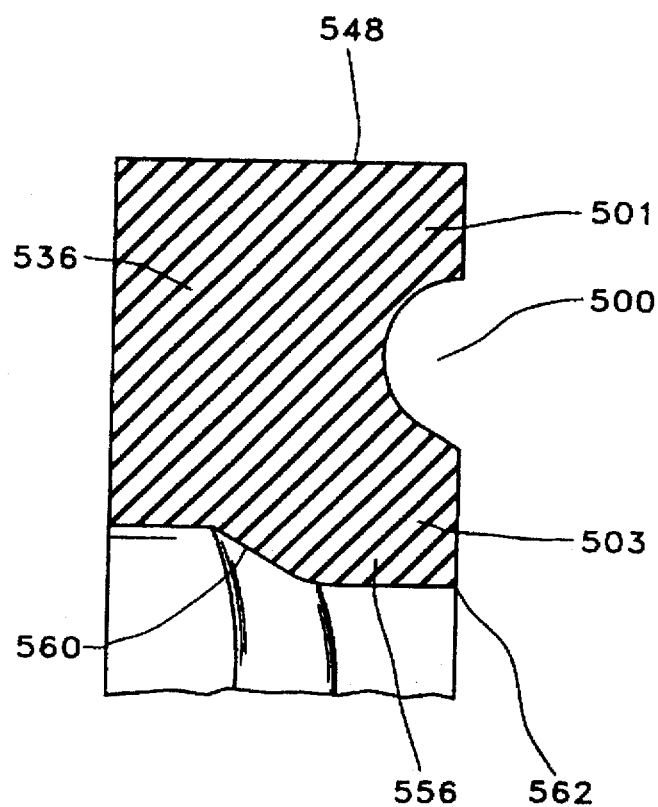
FIG. 7 is a fragmentary sectional view which illustrates a simplified alternate embodiment of the invention wherein the flexible transitional heel geometry and the projecting static lip of the preferred embodiment are omitted, the outer sealing periphery being of a simple cylindrical configuration, and the exclusionary feature being an abrupt axially nonvarying edge.

FIG. 7 illustrates a simplified alternate embodiment of the invention wherein the static sealing surface is provided by a non-projecting periphery 548 rather than by the projecting static lip of the preferred embodiment, and wherein the environmental end groove 500 can be employed without the non-planar flexible heel geometry of the preferred embodiment, circular abrupt non-axially varying edge 562 being employed instead. Thus, the extrusion resistance of the seal is controlled by the modulus of the seal material, and the interfacial contact pressure is controlled by the geometry of the environmental end groove 500 and the geometry of the radially spaced flexible generally circular body rims 501 and 503. As with the preferred embodiment, the resilient seal body 536 incorporates a dynamic sealing lip 556 which incorporates an axially varying hydrodynamic edge 560 and an abrupt circular non-axially varying edge 562. Experiments conducted by the inventor and his associates have confirmed that the environmental end groove alone (without the non-planar flexible transitional heel geometry or the projecting static lip of the preferred embodiment) provides a significant and useful increase in performance over the prior art, although less than can he expected when the environmental end groove construction is combined with the non-planar flexible heel geometry. The embodiment of FIG. 7 is, however, perfectly suitable for applications where the reduction in interfacial contact pressure afforded by the multiple modulus construction is much more important than high pressure capability. For example, centrifugal pumps operate at low pressures where seal extrusion is not a problem, but a low seal interfacial contact pressure is required because the sleeved, solid shaft of the pump is inefficient at conducting self generated heat away from the seals. With the present invention, seals of the configuration shown in FIG. 7 have been experimentally shown to provide satisfactory life in centrifugal pumps, even when water is used as the lubricant.

Figure 8:
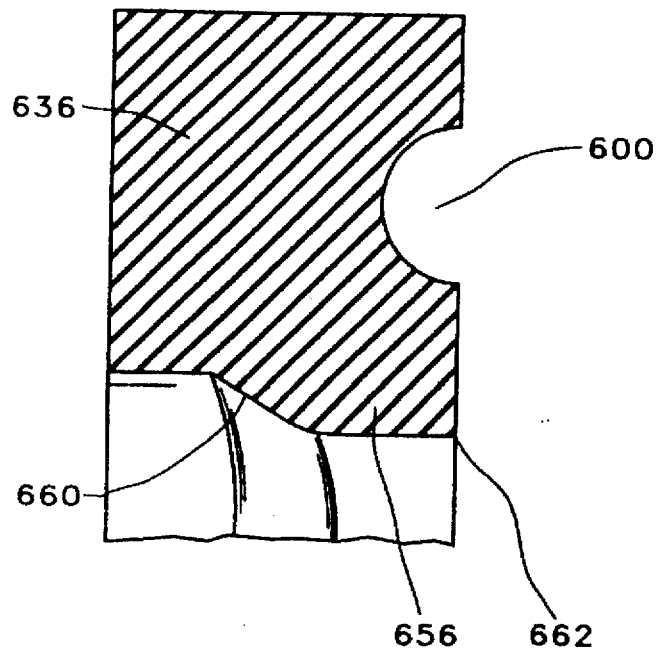
FIG. 8 is a fragmentary sectional view which illustrates an alternate embodiment of the invention wherein the environment side end groove is of semi-circular form.

FIG. 8 illustrates an alternate embodiment of the invention wherein the environmental end groove 600 has a semi-circular shape, which unlike the preferred embodiment, does not match the angle of the hydrodynamic edge 660. Although less convenient to mold than the groove shape depicted in the preferred embodiment, the groove of FIG. 8 can be molded, and can also be produced by other methods, such as by machining. As with the preferred embodiment, the resilient seal body 636 incorporates a dynamic sealing lip 656 which incorporates an axially varying hydrodynamic edge 660 and an abrupt circular non-axially varying edge 662.

Figure 9:
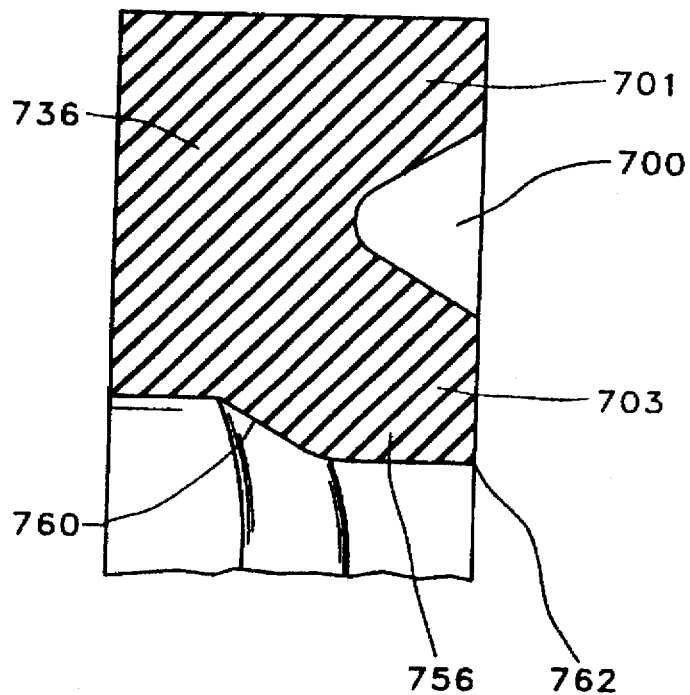
FIG. 9 is a fragmentary sectional view which illustrates an alternate embodiment of the invention wherein the environment side end groove is of a V-shaped form.

FIG. 9 illustrates an alternate embodiment of the invention wherein the environmental end groove 700 has a Vee shape. Other environment end groove shapes are also possible without departing with the spirit and scope of the invention. The resilient seal body 736 is bifurcated at its environment end by the annular environment end groove 700 to define flexible radially spaced generally circular body rims 701 and 703. As with the preferred embodiment, the resilient seal body 736 incorporates a dynamic sealing lip 756 which projects radially from the flexible body rim 703 and incorporates an axially varying hydrodynamic edge 760 and an abrupt circular non-axially varying edge 762.

Figure 10:
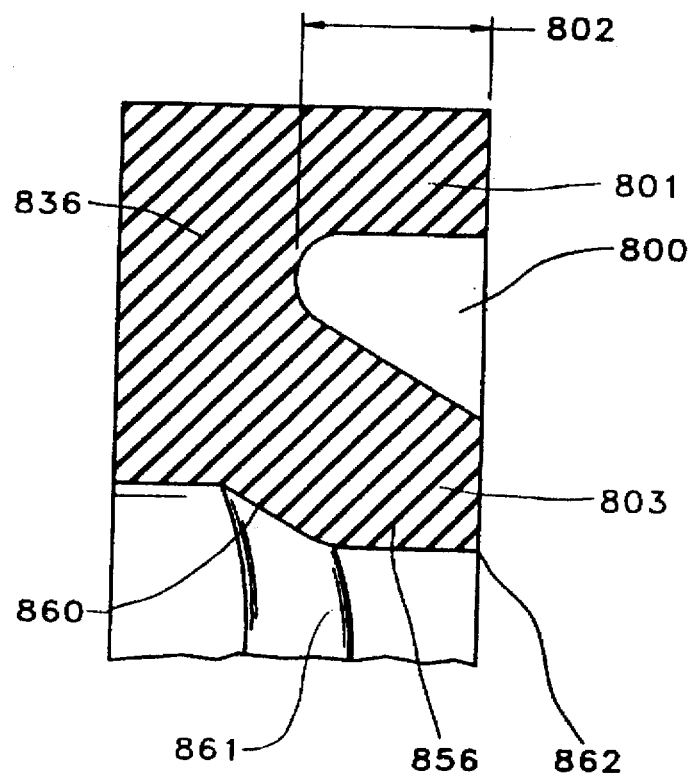
FIG. 10 is a fragmentary sectional view which illustrates an alternate embodiment of the invention wherein the environment side end groove is of a modified V-shaped form.

FIG. 10 illustrates an alternate embodiment of the invention wherein the environmental end groove 800 of the annular seal body 836 has a cross-section of modified Vee shape which separates the environment end of the seal into radially spaced generally circular flexible body rims 801 and 803. The inventors have found that the depth 802 of the groove shape can be as much as the maximum axial width of the seal contact footprint at the maximum height of the wave surface 860 on the hydrodynamic edge. As with the preferred embodiment, the resilient seal body 836 incorporates a dynamic sealing lip 856 which incorporates an axially varying hydrodynamic edge 861 and an abrupt circular non-axially varying exclusionary edge 862.

As will be readily apparent to those skilled in the art, the present invention may be produced in other specific forms without departing from its spirit or essential characteristics. The present embodiments are therefore to be considered as illustrative and not restrictive.

What is claimed is:

1. A resilient hydrodynamic seal for location within a housing defining a lubricant chamber containing lubricant and for dynamic interference sealing engagement with a relatively rotatable surface and for serving as a partition between the lubricant chamber and a contaminated environment, comprising:

(a) a circular ring-like seal body being composed of resilient sealing material and defining axial ends, one of said axial ends being a lubricant end adapted to be exposed to the lubricant chamber, the other of said axial ends being an environment end adapted to be exposed to the contaminated environment;

(b) a circular dynamic sealing lip being defined by said circular ring-like seal body at said environment end and having an axially varying edge at one axial extremity thereof defining a hydrodynamic end for exposure to lubricant in the lubricant chamber and having an abrupt axially nonvarying edge at the opposite axial extremity thereof and defining an environment end of said circular dynamic sealing lip for exposure to the contaminated environment, said circular dynamic sealing lip further having a peripheral sealing surface for establishing a seal contact footprint of varying axial width with the relatively rotatable surface; and (c) said circular ring-like seal body defining radially spaced flexible generally circular body rims at said environment end of said circular ring-like seal body and defining a generally circular groove intermediate said generally circular flexible body rims, said generally circular groove opening toward the contaminated environment, said radially spaced flexible generally circular body rims being radially flexible inwardly to control interfacial contact pressure of said seal with the housing and with the relatively rotatable surface and thus regulating hydrodynamic film thickness, one of said generally circular body rims defining at least a portion of said circular dynamic sealing lip.

2. The resilient hydrodynamic seal of claim 1, wherein: said generally circular groove being of curved cross-sectional configuration.

3. The resilient hydrodynamic seal of claim 1, wherein: said seal contact footprint with the relatively rotatable surface varying axially in width along the circumference thereof and said generally circular groove having an axial depth varying in sequence with said axial width of said seal contact footprint.

4. The resilient hydrodynamic seal of claim 1, wherein:
    (a) said seal contact footprint with the relatively rotatable surface varying in axial width along the circumference thereof and having a maximum axial width and a minimum axial width; and
    (b) said generally circular groove having an axial depth at least as great as the maximum axial width of said seal contact footprint.

5. The resilient hydrodynamic seal of claim 1, wherein:
    (a) said seal contact footprint with the relatively rotatable surface varying in axial width along the circumference thereof and having a maximum axial width and a minimum axial width and having a median axial width; and
    (b) said generally circular groove having an axial depth at least as great as the median axial width of said seal contact footprint.

6. The resilient hydrodynamic seal of claim 1, wherein:
    (a) said hydrodynamic end of said circular dynamic sealing lip defining a predetermined flank angle relative to said peripheral sealing surface; and
    (b) said generally circular groove being defined in part by a groove surface section having a flank angle substantially the same as said predetermined flank angle.

7. The resilient hydrodynamic seal of claim 6, wherein said housing and said relatively rotatable surface define a circular clearance therebetween and wherein:
    (a) said circular ring-like seal body defining an end surface being oriented in substantially normal relation with said peripheral sealing surface and defining at least a portion of said environment end;
    (b) said environment end defining a non-planar transitional heel geometry having a circular surface having intersection with said environment end surface at a location radially remote from said peripheral sealing surface and having intersection with said peripheral sealing surface at a location axially remote from said environment end surface.

8. The resilient hydrodynamic seal of claim 7, wherein: said circular surface being of concave cross-sectional configuration.

9. The resilient hydrodynamic seal of claim 7, wherein: said circular surface being of conical cross-sectional configuration.

10. The resilient hydrodynamic seal of claim 7, wherein: a circular static sealing lip projecting radially from said circular ring-like seal body and being located in substantially radially opposed relation with said circular dynamic sealing lip.

11. The resilient hydrodynamic seal of claim 1, wherein:
    (a) said peripheral sealing surface being of cylindrical configuration;
    (b) said circular ring-like seal body defining an end surface being oriented in substantially normal relation with said peripheral sealing surface; and
    (c) said environment end of said circular dynamic sealing lip defining a circular substantially angularly oriented transitional heel geometry intersecting said end surface of said circular ring-like seal body and said peripheral sealing surface.

12. The resilient hydrodynamic seal of claim 7, further comprising:
a circular static sealing lip projecting radially from said circular ring-like seal body and being located in substantially radially opposed relation with said circular dynamic sealing lip.

13. The resilient hydrodynamic seal of claim 1, wherein:
(a) said seal contact footprint with the relatively rotatable surface axially varying at said hydrodynamic end; and
(b) said generally circular groove having a varying axial depth substantially varying in sequence with the axial width of said seal contact footprint.

14. The resilient hydrodynamic seal of claim 1, wherein:
a static sealing lip projecting radially from said circular ring-like seal body and being located in substantially radially opposed relation with said dynamic sealing lip.

15. The resilient hydrodynamic seal of claim 1, wherein: said generally circular groove being of generally vee-shaped cross-sectional configuration.

16. A resilient hydrodynamic seal for interference sealing within a housing defining a lubricant chamber containing lubricant and for dynamic sealing engagement with a relatively rotatable surface and for service as a partition between the lubricant chamber and a contaminated environment, comprising:
(a) a circular ring-like seal body being composed of resilient sealing material and having an axial lubricant end adapted to be exposed to lubricant within the lubricant chamber and having an axial environment end adapted to be exposed to the contaminated environment;
(b) a circular dynamic sealing lip being defined by said circular ring-like seal body and having an axial lubricant end and an axial environment end, said circular dynamic sealing lip having a hydrodynamic edge defining an axially varying hydrodynamic geometry at one axial extremity thereof defining an axially varying hydrodynamic end surface for exposure to the lubricant chamber and defining an abrupt axially non-varying exclusionary edge geometry at the opposite axial extremity thereof for exposure to the contaminated environment, said circular dynamic sealing lip further defining a peripheral sealing surface of axially varying width throughout the periphery thereof for interference sealing with the relatively rotatable surface;
(c) said circular ring-like seal body defining radially spaced flexible body rims for exposure to the contaminated environment, one of said radially spaced flexible body rims having said circular dynamic sealing lip at least partially thereon, said radially spaced flexible generally circular body rims being radially deformable to control interfacial contact pressure of said peripheral sealing surface with the relatively rotatable surface and thus regulating hydrodynamic film thickness, one of said radially spaced body rims defining an environment end surface oriented in substantially normal relation with said peripheral sealing surface; and
(d) one of said radially spaced flexible body rims defining a non-planar transitional heel geometry having intersection with said end surface at a location radially remote from said peripheral sealing surface and having intersection with said peripheral sealing surface at a location axially remote from said environment end surface.

17. A resilient hydrodynamic seal for interference sealing within a housing defining a lubricant chamber containing lubricant and for dynamic sealing engagement with a relatively rotatable surface and for serving as a partition between the lubricant chamber and a contaminated environment, comprising:
(a) a circular ring-like seal body being composed of resilient sealing material and having an axial lubricant end adapted to be exposed to lubricant within the lubricant chamber and having an axial environment end adapted to be exposed to the contaminated environment;
(b) a circular dynamic sealing lip being defined by said circular ring-like seal body at said axial environment end and having a hydrodynamic edge defining an axially varying hydrodynamic edge geometry at one axial extremity thereof defining an axial hydrodynamic end of said circular dynamic sealing lip for exposure to lubricant within the lubricant chamber and having an abrupt axially nonvarying exclusionary edge geometry at the opposite axial extremity thereof for exposure to the contaminated environment and further having a peripheral sealing surface for interference sealing engagement with the relatively rotatable surface;
(c) said circular ring-like seal body defining radially spaced flexible generally circular body rims defining a generally circular groove therebetween and opening toward the contaminated environment, said radially spaced flexible generally circular body rims being radially flexible to control interfacial contact pressure of said seal with the housing and with the relatively rotatable surface and thus regulating hydrodynamic film thickness; and
(d) a generally circular static sealing lip projecting radially from said circular ring-like seal body for contact with the housing and being located in substantially radially opposed relation with said dynamic sealing lip.

18. The resilient hydrodynamic seal of claim 17, wherein:
(a) said peripheral sealing surface being cylindrical and having an axially varying width throughout the circumference thereof; and
(b) said generally circular groove of said circular ring-like seal body having axially varying depth corresponding to said axially varying width of said peripheral sealing surface.

19. The resilient hydrodynamic seal of claim 17, wherein:
(a) one of said spaced flexible generally circular body rims defining at least a portion of said circular dynamic sealing lip; and
(b) the other of said spaced flexible generally circular body rims defining at least a portion of said generally circular static sealing lip.

20. The resilient hydrodynamic seal of claim 17, wherein:
said environment end of said circular ring-like seal body defining a non-planar transitional heel geometry having a circular transitional surface intersecting said end surface at a location radially remote from said peripheral sealing surface and having intersection with said peripheral sealing surface at a location axially remote from said end surface.

* * * * *